US006572060B2

United States Patent
Yoon

(10) Patent No.: US 6,572,060 B2
(45) Date of Patent: Jun. 3, 2003

(54) AUTOMATICALLY COLLAPSIBLE PROP

(75) Inventor: Kyung-Bun Yoon, Kwangmyung (KR)

(73) Assignee: Q-Boak Sports, Inc. (KR)

( * ) Notice: Subject to any disclaimer, the term of this patent is extended or adjusted under 35 U.S.C. 154(b) by 0 days.

(21) Appl. No.: 10/092,019

(22) Filed: Mar. 6, 2002

(65) Prior Publication Data

US 2002/0125381 A1 Sep. 12, 2002

(30) Foreign Application Priority Data

Mar. 10, 2001 (KR) ........................................ 2001-12483
Apr. 6, 2001 (KR) ........................................ 2001-18160

(51) Int. Cl.[7] ........................ F16M 11/00; F16M 11/32
(52) U.S. Cl. ...................... 248/163.1; 248/97; 248/167; 248/188.5; 248/188.8; 248/292.12
(58) Field of Search ........................... 248/188.5, 188.8, 248/292.12, 688, 677, 96, 97, 422, 188, 163.1, 166, 167; 206/315.8, 315.7, 315.3

(56) References Cited

U.S. PATENT DOCUMENTS

| | | | | |
|---|---|---|---|---|
| 4,266,419 A | * | 5/1981 | Grundfest | 72/452.4 |
| 4,279,553 A | * | 7/1981 | Cleary | 408/135 |
| 4,781,499 A | * | 11/1988 | Wisecarver | 410/151 |
| 5,094,579 A | * | 3/1992 | Johnson | 411/107 |
| 5,662,296 A | * | 9/1997 | Wu | 248/96 |
| 5,813,647 A | * | 9/1998 | Chen | 248/354.7 |
| 5,897,085 A | * | 4/1999 | Cronin | 248/200.1 |
| 5,988,963 A | * | 11/1999 | Shiau | 410/151 |
| 6,371,422 B1 | * | 4/2002 | St. Martin et al. | 248/200.1 |

FOREIGN PATENT DOCUMENTS

JP 407067993 A * 3/1995 .......... A63B/55/06

* cited by examiner

Primary Examiner—Leslie A. Braun
Assistant Examiner—Amy J. Sterling
(74) Attorney, Agent, or Firm—Harness, Dickey & Pierce, P.L.C.

(57) ABSTRACT

An automatically collapsible prop for propping all kinds of loads such as golf bag, knapsack, coolie rack, etc., comprises a first tubular member having an upper end and an open lower end, a second tubular member relatively moveably inserted in the first tubular member so as to slide down by gravity relative to it to protrude from the open lower end of the first tubular member by a predetermined length when lifting the first member in a sloping or vertical position, and a third member rotationally mounted on a fixed shaft attached to the second tubular member so as to pivot relative to the first and second members about the fixed shaft. A first engaging groove is formed in the surface of the first member in the longitudinal direction to allow the second member with the third member to slide relative to the first member. A rack-gear mechanism is provided to automatically pivot the third member on the fixed shaft by a predetermined propping angle when the part of the second member protruding from the open lower end of the first member is pressed against the ground, and pushed completely into the open lower end of the first member, thereby fixing the third member on the ground in a triangular shape with the first member.

12 Claims, 10 Drawing Sheets

AUTOMATICALLY COLLAPSIBLE PROP

BACKGROUND OF THE INVENTION

1. Field of the Invention

The present invention relates to a prop for propping a traveler's trunk, handcart, golf bag, knapsack, coolie rack, baby carrier, tripod, easel, etc.

2. Description of the Related Art

The conventional collapsible support structures such as portable chair, tripod, and easel are manually collapsed for reservation, or manually spread for use. For example, a conventional support structure permanently attached to a container such as golf bag comprises a pair of legs that may be spread and held in a triangular form by corresponding auxiliary poles manually pushed outward when the golf bag is placed down on the ground. Further, it is completely exposed to the outside, making the user inconvenient especially when carrying the golf bag.

SUMMARY OF THE INVENTION

It is an object of the present invention to provide a prop automatically spread or collapsed according as it is placed in the support or rest position for supporting a pack or in the lift position for carrying a pack.

It is another object of the present invention to provide a prop automatically spread or collapsed, which may be integrally attached to a trunk, handcart, golf bag, knapsack, coolie rack, baby carrier, tripod, easel, etc.

According to an aspect of the present invention, an automatically collapsible prop for propping all kinds of loads such as golf bag, knapsack, coolie rack, etc., comprises a first tubular member having an upper end and an open lower end, a second tubular member relatively moveably inserted in the first tubular member so as to slide down by gravity relative to it to protrude from the open lower end of the first tubular member by a predetermined length when lifting the first member in a sloping or vertical position, a third member rotationally mounted on a fixed shaft attached to the second tubular member so as to pivot relative to the first and second members about the fixed shaft, a first engaging groove formed in the surface of the first member in the longitudinal direction to allow the second member with the third member to slide relative to the first member, and a rack-gear mechanism for automatically pivoting the third member on the fixed shaft by a predetermined propping angle when the part of the second member protruding from the open lower end of the first member is pressed against the ground, and pushed completely into the open lower end of the first member, thereby fixing the third member on the ground in a triangular form with the first member.

According to another aspect of the present invention, an automatically collapsible prop for propping all kinds of loads such as golf bag, knapsack, coolie rack, etc., comprises a first tubular member having an upper end and an open lower end, a second tubular member relatively moveably inserted in the first tubular member so as to slide down by gravity relative to it to protrude from the open lower end of the first tubular member by a predetermined length when lifting the first member in a sloping or vertical position, a third member rotationally mounted on a fixed shaft attached to the second tubular member so as to pivot relative to the first and second members about the fixed shaft, a first engaging groove formed in the surface of the first member in the longitudinal direction to allow the second member with the third member to slide relative to the first member, a rack fixedly mounted on the inside of the first member so as to protrude into the internal space of the second member, and a gear attached to the upper end of the third member for engaging the rack through the first and second members to pivot the third member, whereby free sliding down of the second member to protrude the lower end part from the lower end of the first member causes the upper side surface of the tooth of the rack to push upward the lower side surface of the tooth of the gear to rotate the gear clockwise for the third member to automatically collapse towards the first member, and laying down the lower end part of the second member protruding from the lower end of the first member to completely insert the lower end part of the second member into the first member causes the lower side surface of the tooth of the rack to push downward the upper side surface of the tooth of the gear to rotate the gear counter-clockwise for the third member to automatically spread from the first member in a triangular shape.

The present invention will now be described more specifically with reference to the drawings attached only by way of example.

BRIEF DESCRIPTION OF THE ATTACHED DRAWINGS

DETAILED DESCRIPTION OF THE PREFERRED EMBODIMENT

Figure 1:
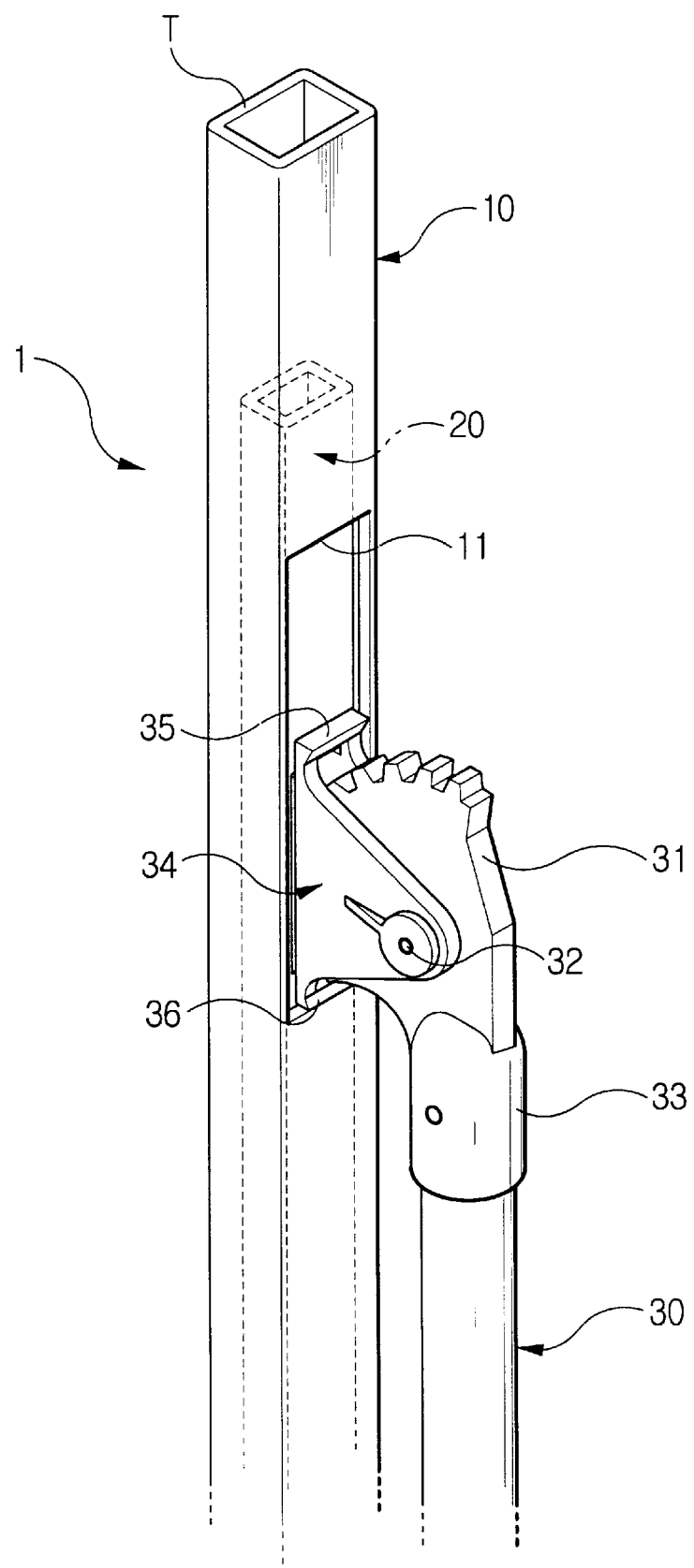
FIG. 1 is a perspective view for illustrating an automatically collapsible prop according to the present invention.

Referring to FIGS. 1 to 3B, an automatically collapsible prop 1 comprises a first tubular member having an upper end T and an open lower end B, second tubular member 20 inserted in the first tubular member, and third 30 connected to the second member. The first tubular member has a lower end B opened for allowing the lower end of the second tubular member to freely slide into or out of it. Namely, the second tubular member 20 is arranged in the inside of the first tubular member 10 so as to make a sliding movement relative thereto, so that it protrudes from the lower end of the first tubular member 10 by a predetermined length when lifting up the first tubular member vertically or slantingly, as shown in FIG. 3A. The third member 30 is jointed to the second tubular member 20 by means of a shaft 32 fixedly mounted thereon so as to make a pivotal motion relative to the first and second tubular members 10 and 20.

Figure 3A:
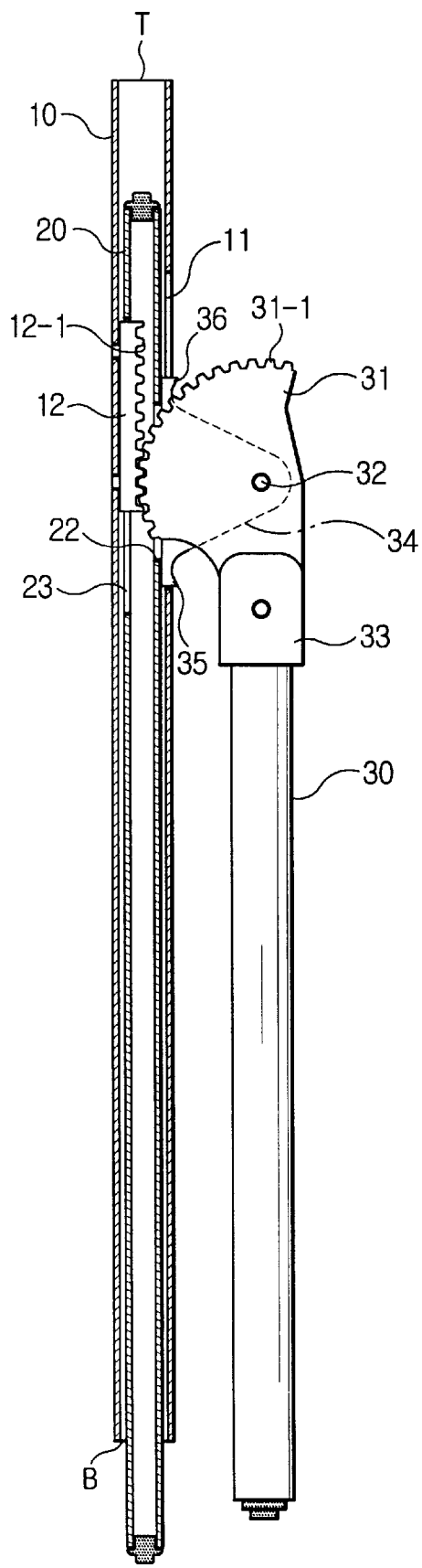
FIGS. 3A and 3B are partly cross-sectioned views for illustrating the operation of the automatically collapsible prop of FIG. 1.
Figure 3B:
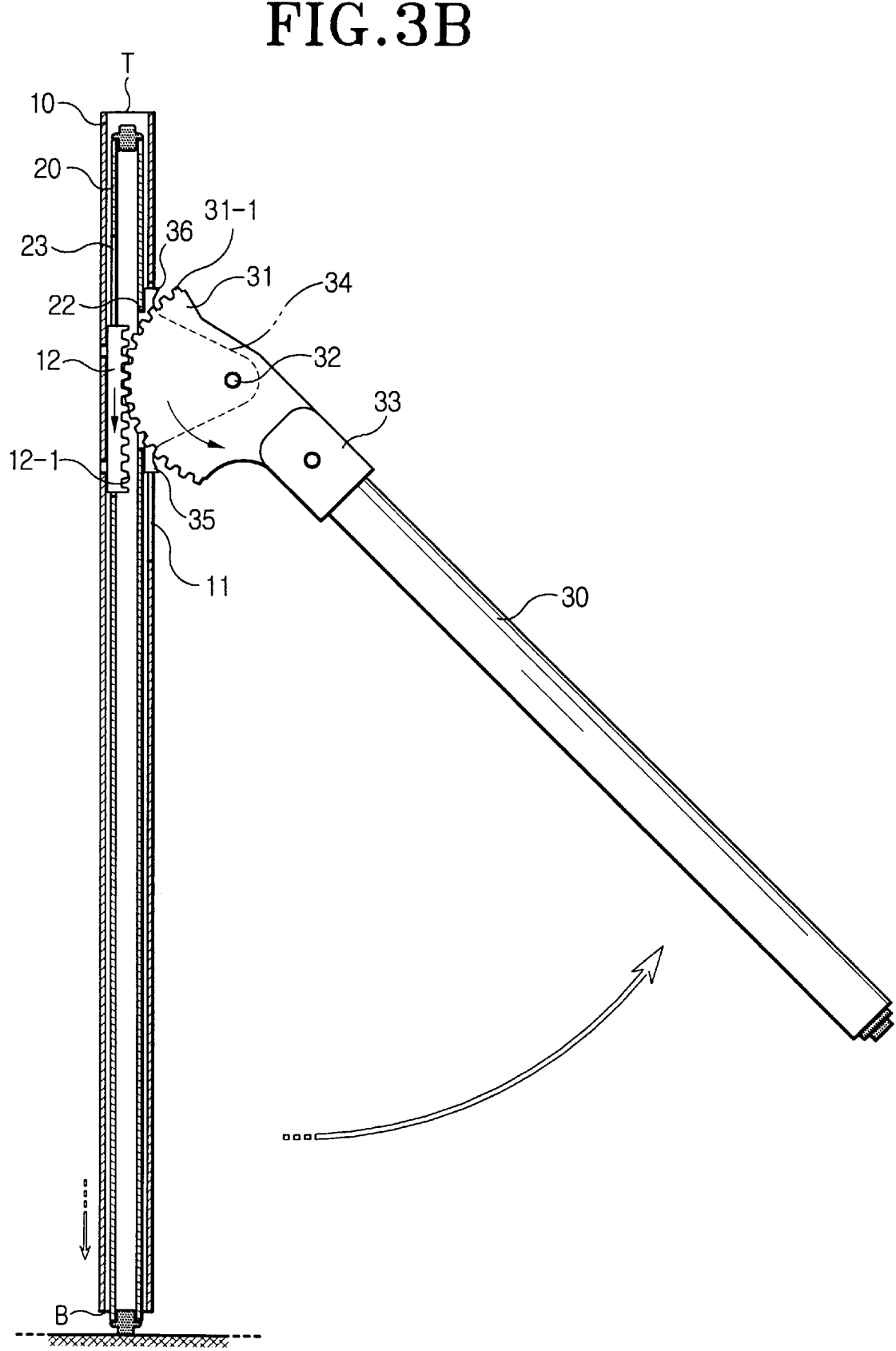
Figure 4A:
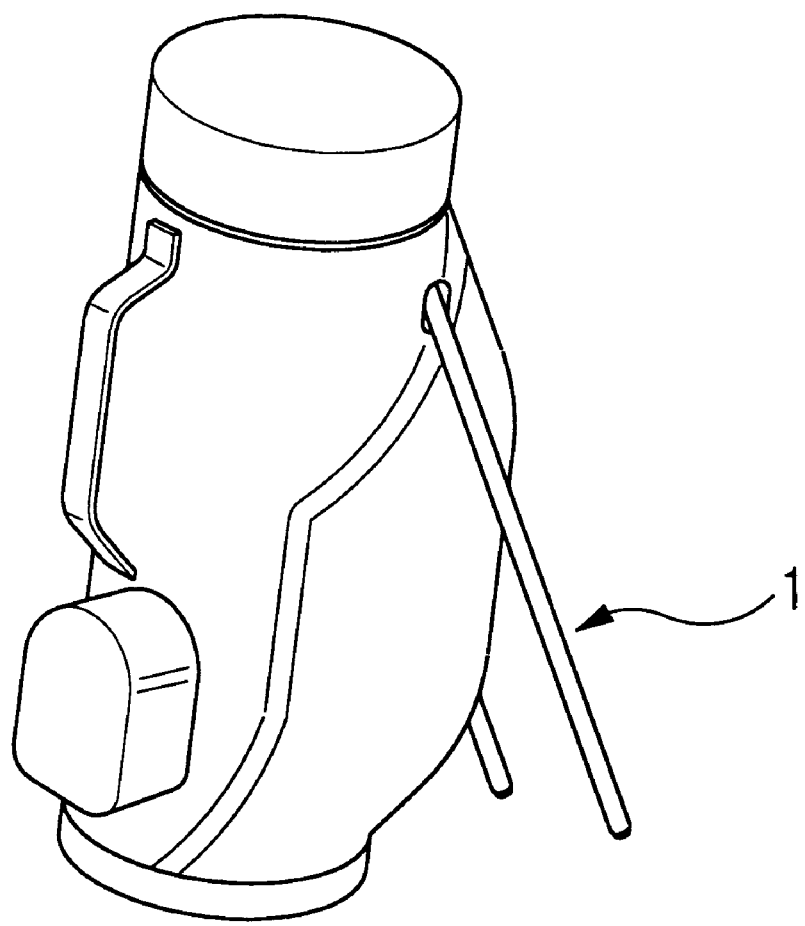
FIGS. 4A to 4F illustrate examples of various loads provided with an automatically collapsible prop according to the present invention.
Figure 4B:
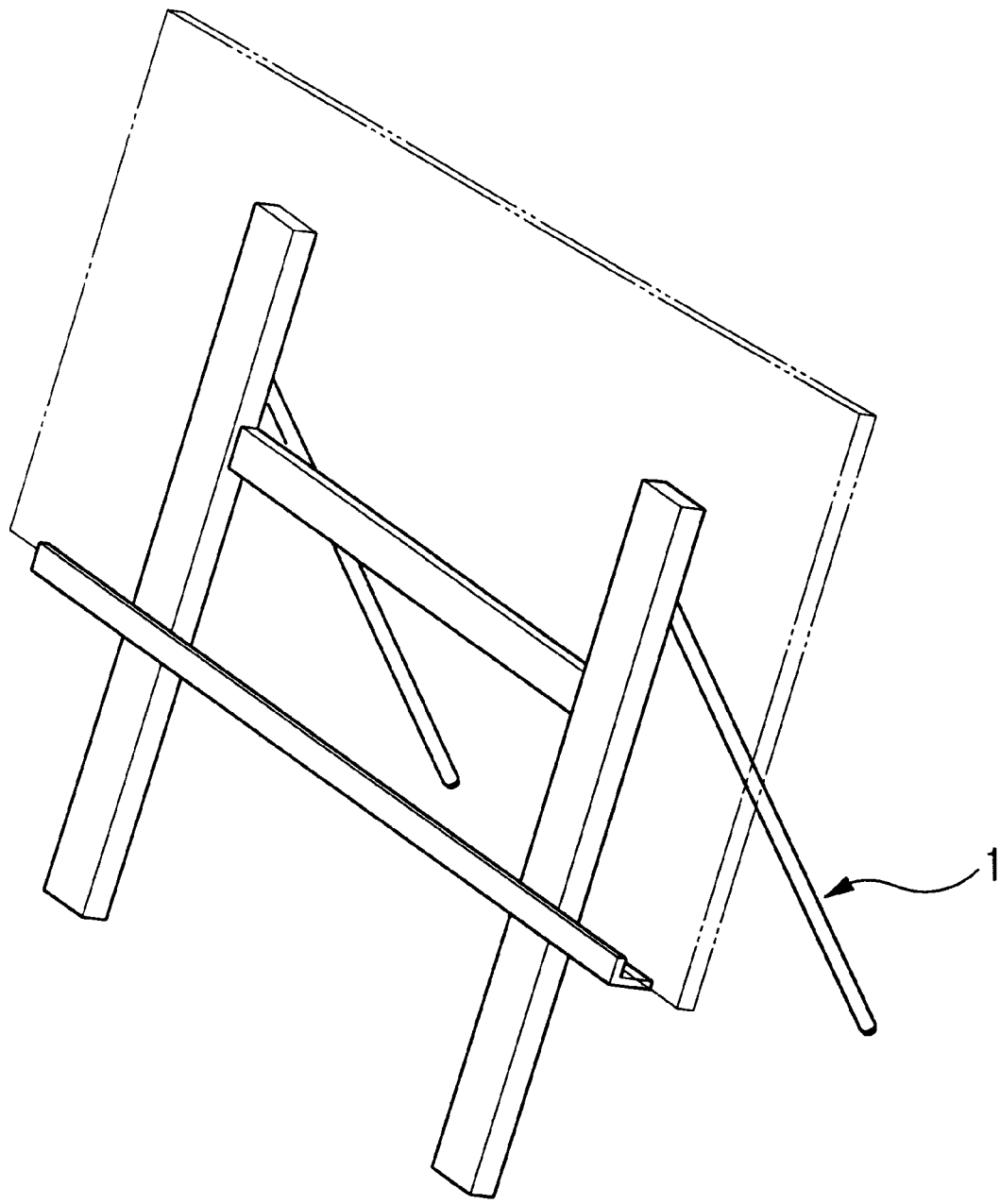
Figure 4C:
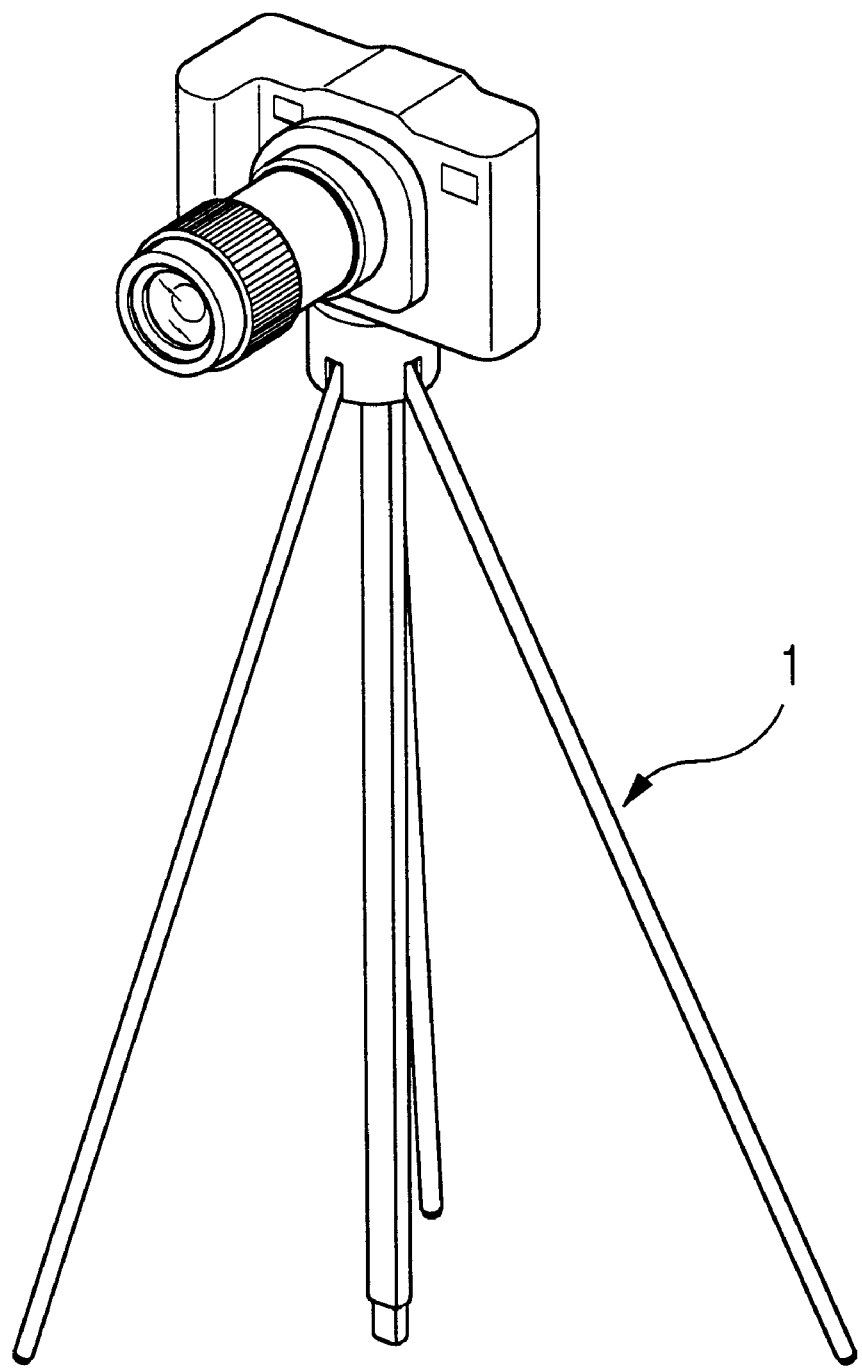
Figure 4D:
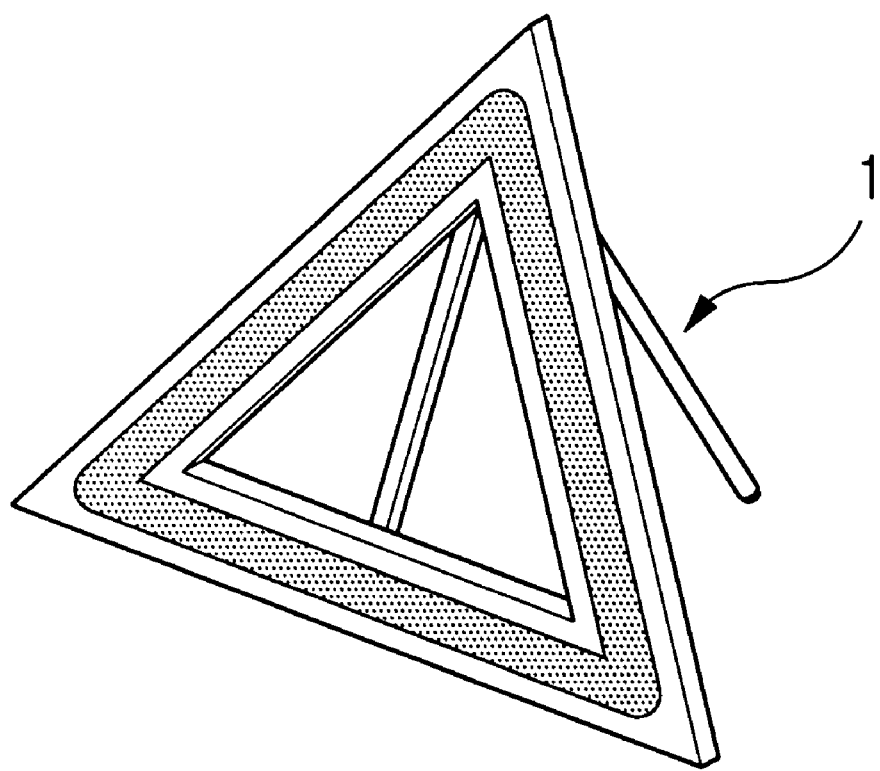
Figure 4E:
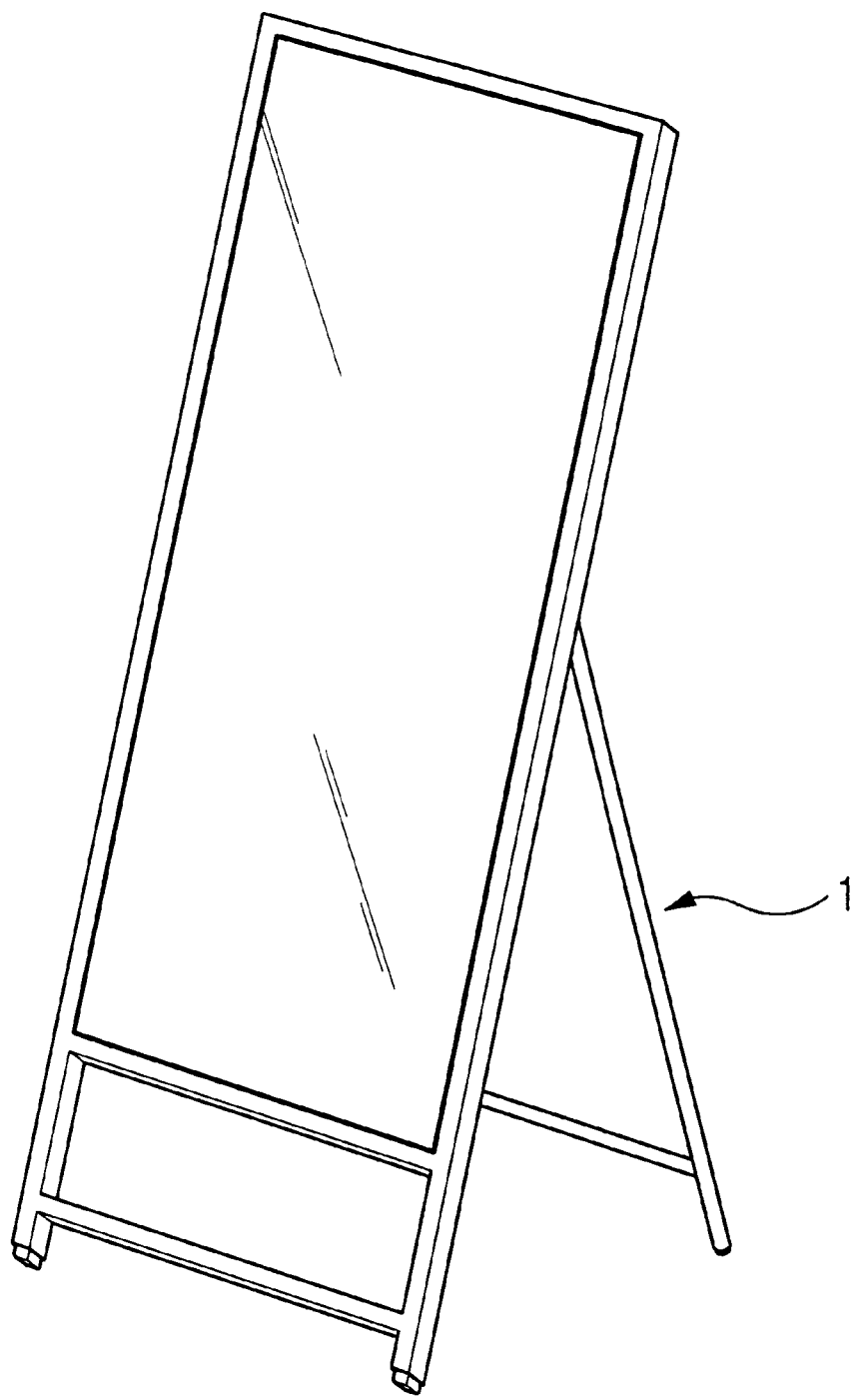
Figure 4F:
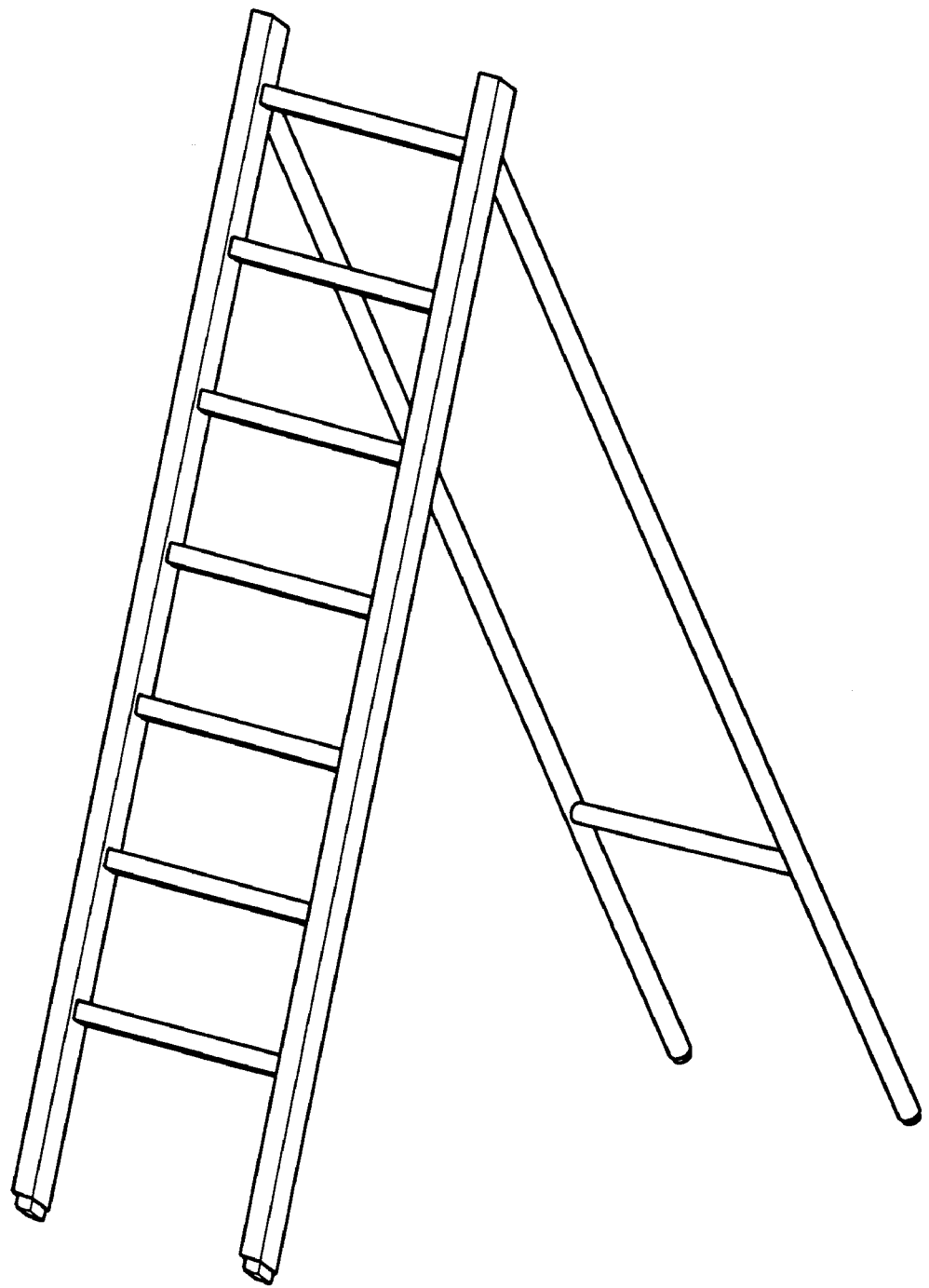

The first tubular member 10 is provided with a first engaging groove 11 lengthwise so as to allow the second tubular member 20 having the third member 30 mounted by the shaft 32 to make a sliding motion relative to the first member 10. A rack-gear mechanism is provided for the third member 30 to automatically spread or collapse as the second member 20 makes a sliding motion relative to the first member 10, as shown in FIGS. 3A and 3B.

Figure 2:
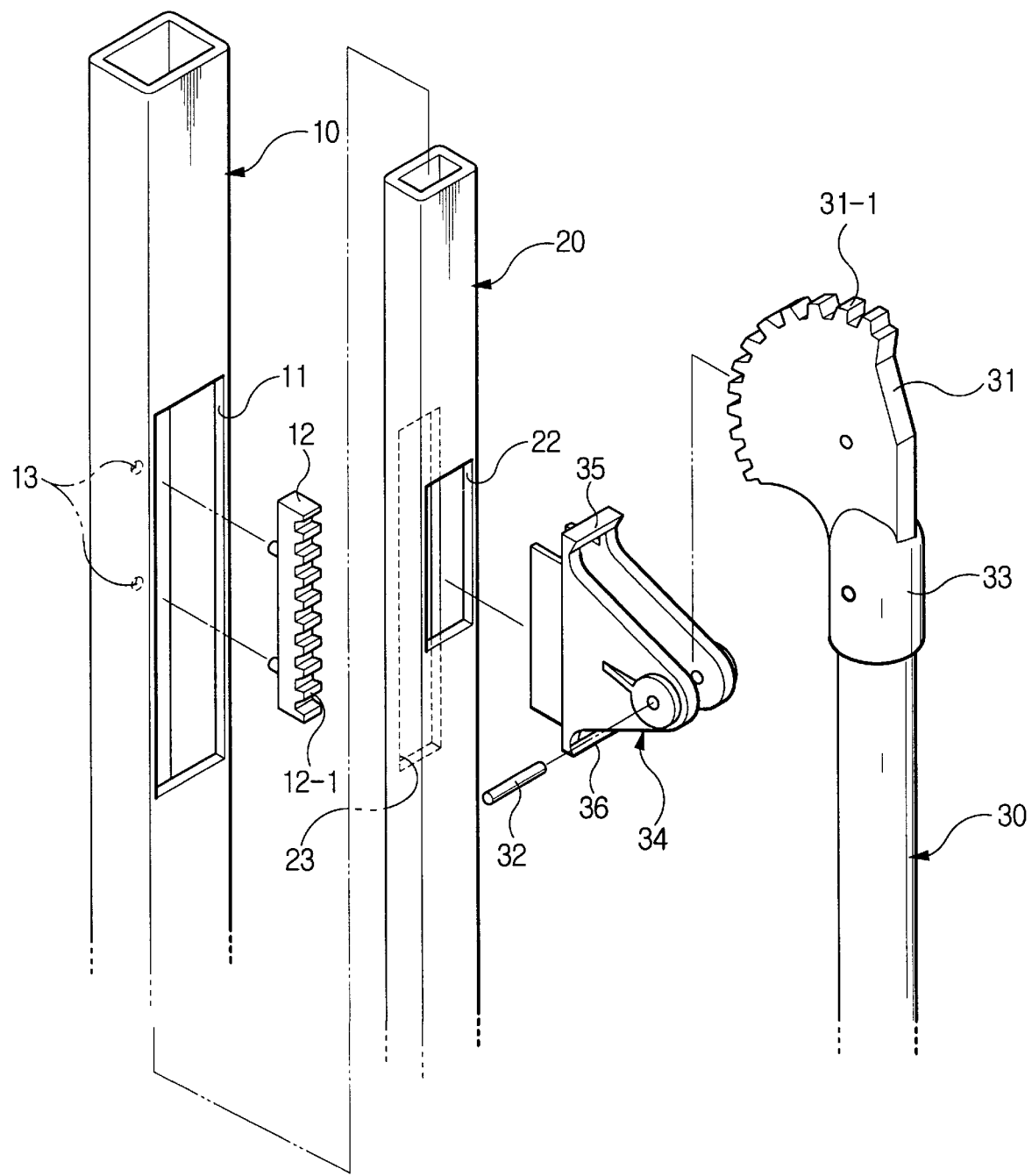
FIG. 2 is an exploded perspective view of the automatically collapsible prop of FIG. 1.

Referring to FIG. 2, a rack-gear mechanism comprises a rack 12 fixedly mounted on the inside of the first member 10 so as to protrude into the internal space of the second member 20, and a gear 31 attached to the upper end of the third member 30 for engaging the rack 12 through the first and second members 10 and 20 to pivot the third member on the fixed shaft 32 relative to the second member 20. Referring to FIG. 3B, the arrow shown on the rack 12 fixedly attached to the first member indicates the motion relative to the second member 20. The tooth of the gear and rack preferably has a rectangular shape, as shown in FIGS. 1 to 3B.

To this end, a second engaging groove 22 is formed in the surface of the second member 20 in the longitudinal direction to allow the gear 31 to engage the rack 12 for smooth pivoting. As shown in FIG. 1, a shaft base 34 is attached around the second engaging groove for mounting the fixed shaft 32, having a stopping device to limit the sliding distance of the second member 20 relative to the first member 10 by abutting both ends of the first engaging groove 11. The stopping device comprises a pair of stopping surfaces 35 and 36.

A third engaging groove 23 is formed in the surface of the second member 20 facing the rack 12 for receiving it so as to allow the second member to longitudinally move relative to the first member 10 and thus the rack 12, as shown by dotted lines in FIG. 2. The lengths of the first and third engaging grooves 11 and 23 and the position of the rack 12 are designed to obtain a predetermined propping angle of the third member 30, as shown in FIG. 3B. For example, the propping angle of the third member 30 may be about 30°, 45° or 60° according as the displacement of the second member 20 is about 15 mm, 22.5 mm or 30 mm. The third member 30 may be separately formed from the gear 31, and inserted in a socket 33 integrally formed on the gear 31, as shown in FIG. 3B. Or otherwise, it may be integrally formed with the gear (not shown).

FIGS. 4A to 4F show the examples of the inventive automatically collapsible prop being applied to a golf bag, easel, camera tripod, road-repair marking panel, baby carriage, ladder, etc. Besides, it may be applied to a knapsack, handcart, traveler's trunk, and Korean traditional coolie rack. For example, applying it to a golf bag, the first member is vertically attached to the back of the golf bag. Of course, the first member may be embedded in the surface of the back of the golf bag so as not to be exposed.

In operation, lifting up vertically or slantingly the load such as golf bag, knapsack, easel, camera trip, etc. provided with the inventive collapsible prop, the second member 20 freely slides downwards so as to protrude its lower end from the lower end of the first member 10 by the length determined by the lengths of the first and third engaging grooves 11 and 23 and the vertical position of the rack 12. This motion causes the upper side surface of the tooth 12-1 of the rack 12 to push upwards the lower side surface of the tooth 31-1 of the gear 31 engaging the rack 12, so that the gear 31 rotates clockwise to make the third member 30 automatically be collapsed towards the first member, as shown in FIG. 3A.

On the contrary, putting the load down on the ground, the lower end of the second member 20 protruding from the lower end of the first member 10 is pressed on the ground, sliding into the first member 10. This motion causes the lower side surface of the tooth 12-1 of the rack 12 to push downwards the upper side surface of the tooth 31-1 of the gear 31 engaging the rack 12, so that the gear 31 rotates counterclockwise to make the third member 30 automatically spread in a triangular form from the first member, as shown in FIG. 3B, thus obliquely propping up the load on the ground.

While the present invention has been described in connection with specific embodiments accompanied by the attached drawings, it will be readily apparent to those skilled in the art that various changes and modifications may be made thereto without departing the gist of the present invention.

What is claimed is:

1. An automatically collapsible prop for propping all kinds of loads such as golf bag, knapsack, coolie rack, etc., comprising:

a first tubular member having an upper end and an open lower end;

a second tubular member relatively moveably inserted in said first tubular member so as to slide down by gravity relative to it to protrude from the open lower end of said first tubular member by a predetermined length when lifting said first member in a sloping or vertical position;

a third member rotationally mounted on a fixed shaft attached to said second tubular member so as to pivot relative to said first and second members about said fixed shaft;

a first engaging groove formed in the surface of said first member in the longitudinal direction to allow said second member with said third member to slide relative to said first member; and a rack-gear mechanism for automatically pivoting said third member on said fixed shaft by a predetermined propping angle when the part of said second member protruding from the open lower end of said first member is pressed against the ground, and pushed completely into the open lower end of said first member, thereby fixing said third member on the ground in a triangular shape with said first member.

2. An automatically collapsible prop as defined in claim 1, wherein said rack-gear mechanism comprises:

a rack fixedly mounted on the inside of said first member so as to protrude into the internal space of said second member;

a gear attached to the upper end of said third member for engaging said rack through said first and second members to pivot said third member on said fixed shaft relative to said second member;

a second engaging groove formed in the surface of said second member in the longitudinal direction to allow said gear to engage said rack for smooth pivoting;

a shaft base attached around said second engaging groove for mounting said fixed shaft and having a stopping device to limit the sliding distance of said second member relative to said first member by abutting both ends of said first engaging groove; and a third engaging groove formed in the surface of said second member facing said rack for receiving said rack so as to allow said second member to longitudinally move relative to said first member and thus said rack.

3. An automatically collapsible prop as defined in claim 2, wherein said gear is a sectional gear, and the tooth of said gear and rack has a rectangular shape.

4. An automatically collapsible prop as defined in claim 2, wherein the lengths of said first and third engaging grooves and the position of said rack are designed to obtain said predetermined propping angle of said third member.

5. An automatically collapsible prop as defined in claim 2, wherein said third member may be integrally formed with said gear, or separately formed and connected to said gear.

6. A golf bag provided with an automatically collapsible prop as defined in one of claims 1 to 5.

7. A mirror provided with an automatically collapsible prop as defined in one of claims 1 to 5.

8. A three-legged stand provided with an automatically collapsible prop as defined in one of claims 1 to 5.

9. An easel provided with an automatically collapsible prop as defined in one of claims 1 to 5.

10. An information indication plate provided with an automatically collapsible prop as defined in one of claims 1 to 5.

11. A ladder provided with an automatically collapsible prop as defined in one of claims 1 to 5.

12. An automatically collapsible prop for propping all kinds of loads such as golf bag, knapsack, coolie rack, etc., comprising:

a first tubular member having an upper end and an open lower end;

a second tubular member relatively moveably inserted in said first tubular member so as to slide down by gravity relative to it to protrude from the open lower end of said first tubular member by a predetermined length when lifting said first member in a sloping or vertical position;

a third member rotationally mounted on a fixed shaft attached to said second tubular member so as to pivot relative to said first and second members about said fixed shaft;

a first engaging groove formed in the surface of said first member in the longitudinal direction to allow said second member with said third member to slide relative to said first member;

a rack fixedly mounted on the inside of said first member so as to protrude into the internal space of said second member; and a gear attached to the upper end of said third member for engaging said rack through said first and second members to pivot said third member, whereby free sliding down of said second member to protrude of the lower end part from the lower end of said first member causes the upper side surface of the tooth of said rack to push upward the lower side surface of the tooth of said gear to rotate said gear clockwise for said third member to automatically collapse towards said first member, and laying down the lower end part of said second member protruding from the lower end of said first member to completely insert the lower end part of said second member into said first member causes the lower side surface of the tooth of said rack to push downward the upper side surface of the tooth of said gear to rotate said gear counterclockwise for said third member to automatically spread from said first member in a triangular shape.

* * * * *